(12) United States Patent
Zhang et al.

(10) Patent No.: US 8,514,167 B2
(45) Date of Patent: Aug. 20, 2013

(54) METHOD, SYSTEM OR APPARATUS FOR ADJUSTING A BRIGHTNESS LEVEL ASSOCIATED WITH AT LEAST A PORTION OF A BACKLIGHT OF A DISPLAY DEVICE

(75) Inventors: Wei Zhang, Hong Kong (CN); Min Chen, Hong Kong (CN)

(73) Assignee: Hong Kong Applied Science and Technology Research Institute Co., Ltd., Shatin ( * ) Notice: Subject to any disclaimer, the term of this patent is extended or adjusted under 35 U.S.C. 154(b) by 910 days.

(21) Appl. No.: 12/565,635

(22) Filed: Sep. 23, 2009

(65) Prior Publication Data

US 2011/0069078 A1  Mar. 24, 2011

(51) Int. Cl.
*G09G 3/36* (2006.01)
*G09G 5/02* (2006.01)

(52) U.S. Cl.
USPC .......................................... 345/102; 345/589

(58) Field of Classification Search
None
See application file for complete search history.

(56) References Cited

U.S. PATENT DOCUMENTS

| 7,460,103 | B2 | 12/2008 | Konno et al. | |
|---|---|---|---|---|
| 2007/0285379 | A1 | 12/2007 | Jung et al. | |
| 2008/0150853 | A1* | 6/2008 | Peng et al. | 345/87 |
| 2008/0284713 | A1 | 11/2008 | Hong | |
| 2009/0079768 | A1* | 3/2009 | Huang | 345/691 |

FOREIGN PATENT DOCUMENTS

CN  101354875  1/2009

OTHER PUBLICATIONS

"Smart Algorithms for Local Dimming LED Backlight" SID Symposium Digest of Technical Papers, vol. 39, Issue 1, May 2008, pp. 986-989.

* cited by examiner

*Primary Examiner* — Tize Ma
*Assistant Examiner* — Yingchun He
(74) *Attorney, Agent, or Firm* — Berkeley Law & Technology Group, LLP

(57) ABSTRACT

Embodiments of methods, systems, or apparatuses relating to adjusting a brightness level associated with at least a portion of a backlight of a display device.

21 Claims, 5 Drawing Sheets

METHOD, SYSTEM OR APPARATUS FOR ADJUSTING A BRIGHTNESS LEVEL ASSOCIATED WITH AT LEAST A PORTION OF A BACKLIGHT OF A DISPLAY DEVICE

BACKGROUND

1. Field

The subject matter disclosed herein relates to methods, systems, or apparatuses relating to adjusting a brightness level associated with at least a portion of a backlight of a display device.

2. Information

Backlights may be used as a light source in display devices, such as televisions, handheld devices, computer devices, or the like. Traditionally, backlights tended to provide a relatively constant or uniform intensity of light to a display panel. For example, light intensity for such backlights is typically uniform or constant spatially and temporally. These constant or uniform backlights, however, may be associated with some potentially undesirable power consumption, thermal management, or display characteristics, as just some examples.

More recently, backlights using local diming technology may mitigate some of the concerns discussed above. These local diming approaches, however, may likewise suffer from some undesirable characteristics; accordingly, there may be a desire to continue to develop approaches or techniques which may potentially improve characteristics which are believed to be desirable.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

Figure 1:
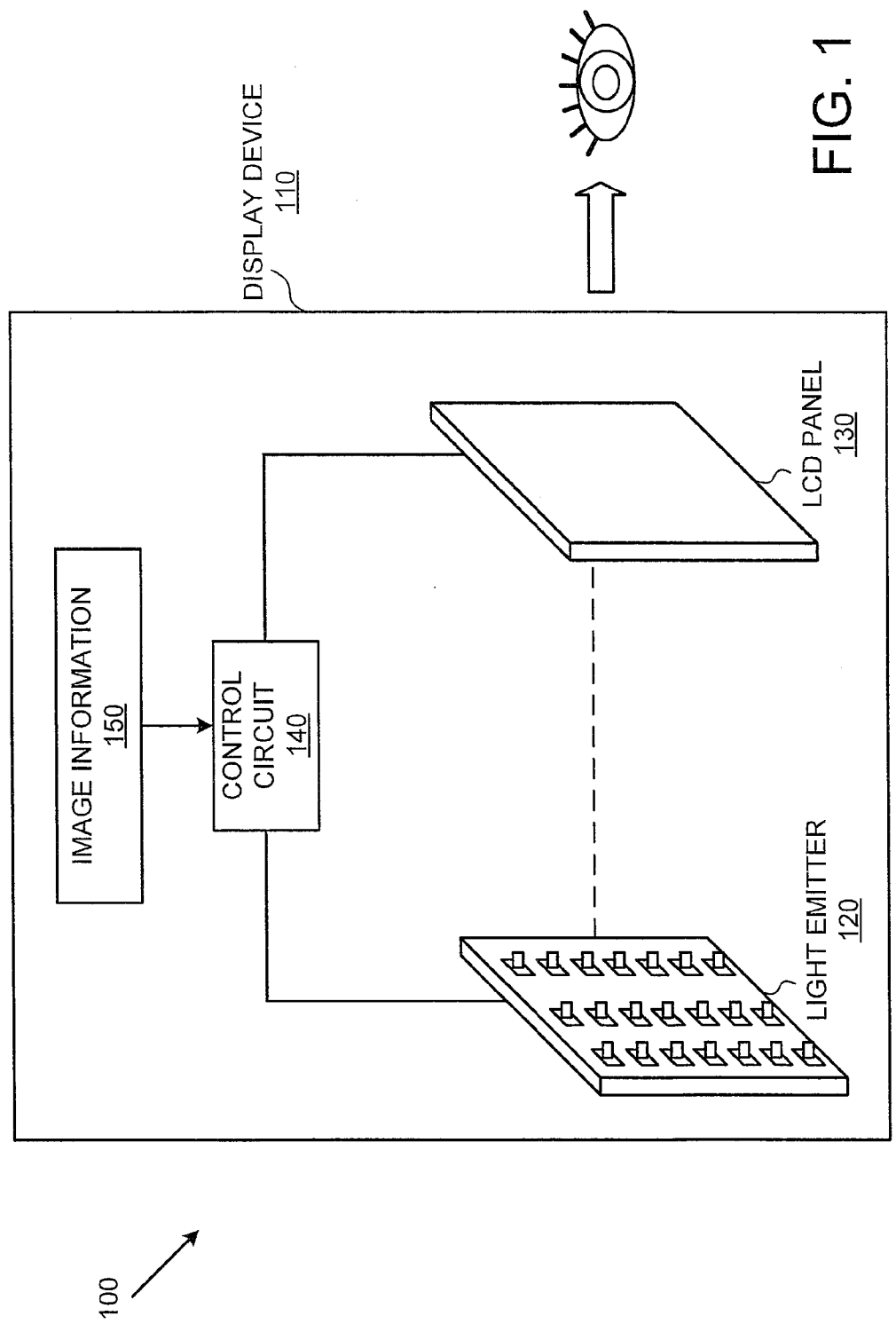
FIG. 1 is a schematic diagram depicting an embodiment of an exemplary display device capable of adjusting a brightness level associated with one or more luminescent bodies.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

In addition, reference is made in the following detailed description to the accompanying drawings, which form a part hereof, wherein like numerals may designate like parts throughout to indicate corresponding or analogous elements. It will be appreciated that for simplicity or clarity of illustration, elements illustrated in the figures have not necessarily been drawn to scale. For example, the dimensions of some of the elements may be exaggerated relative to other elements for clarity. Further, it is to be understood that other embodiments may be utilized and structural or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and examples, illustrations, or the like, do not limit the scope of claimed subject matter defined by the appended claims and their equivalents.

As mentioned previously, local diming approaches with respect to backlights may suffer from some potentially undesirable characteristics. As a starting point, backlights may be used as a light source in display devices, such as televisions, handheld devices, computer devices, or the like. As such, backlight technology or local diming approaches may be one aspect affecting display characteristics of these devices. In this regard, however, some local diming approaches may be associated with less than desirable display characteristics. For instance, backlights which employ a local diming approach may produce static or motion halos, insufficient light at a boundary of a bright object, circumferential flaring, or flicking artifacts, as non-limiting examples. Static halos may occur, for example, due, at least in part, to visible light leakage in a display device; similarly, a motion halo may occur due, at least in part, to an unsynchronized backlight halo with respect to a moving object in an image, as just an example. Likewise, circumferential flaring may appear as lighter halos around brighter objects overlaying a black background. A flickering artifact, for example, may occur if backlight intensity changes too fast with respect to a displayed image.

In addition to potentially undesirable display characteristics, local diming approaches with respect to backlights may suffer from potentially undesirable thermal management or power consumption characteristics. For instance, techniques to perform local diming may utilize undesirable amounts of power, generate undesirable quantities of heat, or have other related issues, for example. Accordingly, there may be a desire to continue to develop approaches or techniques which may potentially improve characteristics which are believed to be desirable.

With these and other concerns in mind, in accordance with certain aspects of the present description, example implementations may include methods, systems, or apparatuses for adjusting a brightness level associated with at least a portion of a backlight of a display device. In certain embodiments, for example, adjusting a brightness level associated with at least a portion of a backlight may include generating one or more signal values corresponding to one or more luminescent bodies of a backlight based, at least in part, on at least one intra-frame value, and/or at least one inter-frame value, as just an example. In this context, a brightness level, such as may be measured in $cd/m^2$, may correspond to one or more intensities associated with one or more signal values. Accordingly, in certain embodiments, adjusting a brightness level may include adjusting an intensity associated with one or more signal values by generating one or more signal values based, at least in part, on at least one intra-frame value, and/or at least one inter-frame value, as just an example.

FIG. 1 is a schematic diagram depicting embodiment 100 of an exemplary display device 110 which is capable of adjusting a brightness level associated with one or more luminescent bodies. Here, for example, display device 110 may comprise any display device, such as a television, a handheld device, a computer device, or the like, as non-limiting examples. It should be noted that, for illustrative purposes, embodiment 100 depicts a simplified representation of display device 110. Accordingly, display device 110 may include numerous components, devices, etc., which have not been depicted in embodiment 100 so as to not obscure claimed subject matter. Thus, display device 110 may include one or more image processors, diffusers, drivers, microcontrollers, microprocessors, memories, buses, or other components or devices, as non-limiting examples. Of course, many of these omitted components or devices may perform, in whole or in part, one or more of the functions described herein.

Display device 110 is depicted having a light emitter 120 which includes an array of luminescent bodies. In this context, a luminescent body means a body capable of emitting light. In certain embodiments, light emitter 120 may comprise a backlight. For instance, a luminescent body associated with light emitter 120 may be a light emitting diode (LED), a cold cathode fluorescent lamp (CCFL), a surface conduction electron emitter display (SED), a field emission display (FED), or the like, as non-limiting examples. Accordingly, in certain embodiments, light emitter 120 may comprise a backlight including a plurality of LEDs. In certain embodiments, LEDs may have multiple color channels, as just an example.

Display device 110 is depicted having a liquid crystal display (LCD) panel 130. In particular implementations, an LCD may employ a backlight to produce light since LCDs are generally not capable of doing so. Thus, in display device 110, light emitter 120 is depicted as being coupled with LCD panel 130. In embodiment 100, light emitter 120 may emit light, some of which may pass through LCD panel 130, as depicted by the direction of arrow in FIG. 1, to a viewer's eye.

In some devices or configurations, there may be a coupling between a light emitter and an LCD panel, such that an LCD panel adjusts a transmissivity of the liquid crystal at least in part in response to light incident on the panel from a light emitter. This interaction between an LCD panel and a light emitter may be controlled by one or more components or devices which, for sake of illustration, are not depicted in FIG. 1. For instance, light emitter 120 and/or LCD panel 130 may have various processors, control circuits, or drivers which control one or more interactions between light emitter 120 and LCD panel 130. For convenience, however, these components or devices are omitted; instead, in embodiment 100, control circuit 140 may perform one more of the functions associated with these various components or devices.

In embodiment 100, control circuit 140 may comprise a microcontroller, microprocessor, integrated chip (IC), and/or the like, as non-liming examples. As suggested above, control circuit 140 is depicted being electrically coupled to light emitter 120 and LCD panel 130. In embodiment 100, control circuit 140 may receive one or more input image signals, such as image information 150, for example. In certain embodiments, image information 150 may be binary digital signals representative of one or more images, such as one or more image frames, for example. Accordingly, image information 150 may include image signal values which, if processed, may correspond, at least in part, to brightness or intensity values for one or more luminescent bodies associated with light emitter 120.

In certain embodiments, control circuit 140 may adjust a brightness level associated with one or more luminescent bodies of light emitter 120. For example, control circuit 140 may generate one or more signal values corresponding to one or more luminescent bodies using image information 150. Accordingly, in certain embodiments, control circuit 140 may receive image information 150 and, based at least in part on image information 150, generate a signal value which comprises at least one intra-frame value, at least one inter-frame value, or a function of values thereof. Control circuit 140 may utilize one or more of the approaches or techniques described herein, such as in FIG. 2, for example, to generate one or more signal values.

Also, control circuit 140 may be capable transmitting or outputting one or more generated signal values, such as one or more intra-frame values or inter-frame values, to LCD panel 130 to adjust one or more pixel values. Accordingly, in certain embodiments, control circuit 140 may adjust one or more pixel values, such as red, green, or blue pixel values of LCD panel 130 based, at least in part, on one or more signal values generated for one or more luminescent bodies associated with light emitter 120, as just an example.

Figure 2:
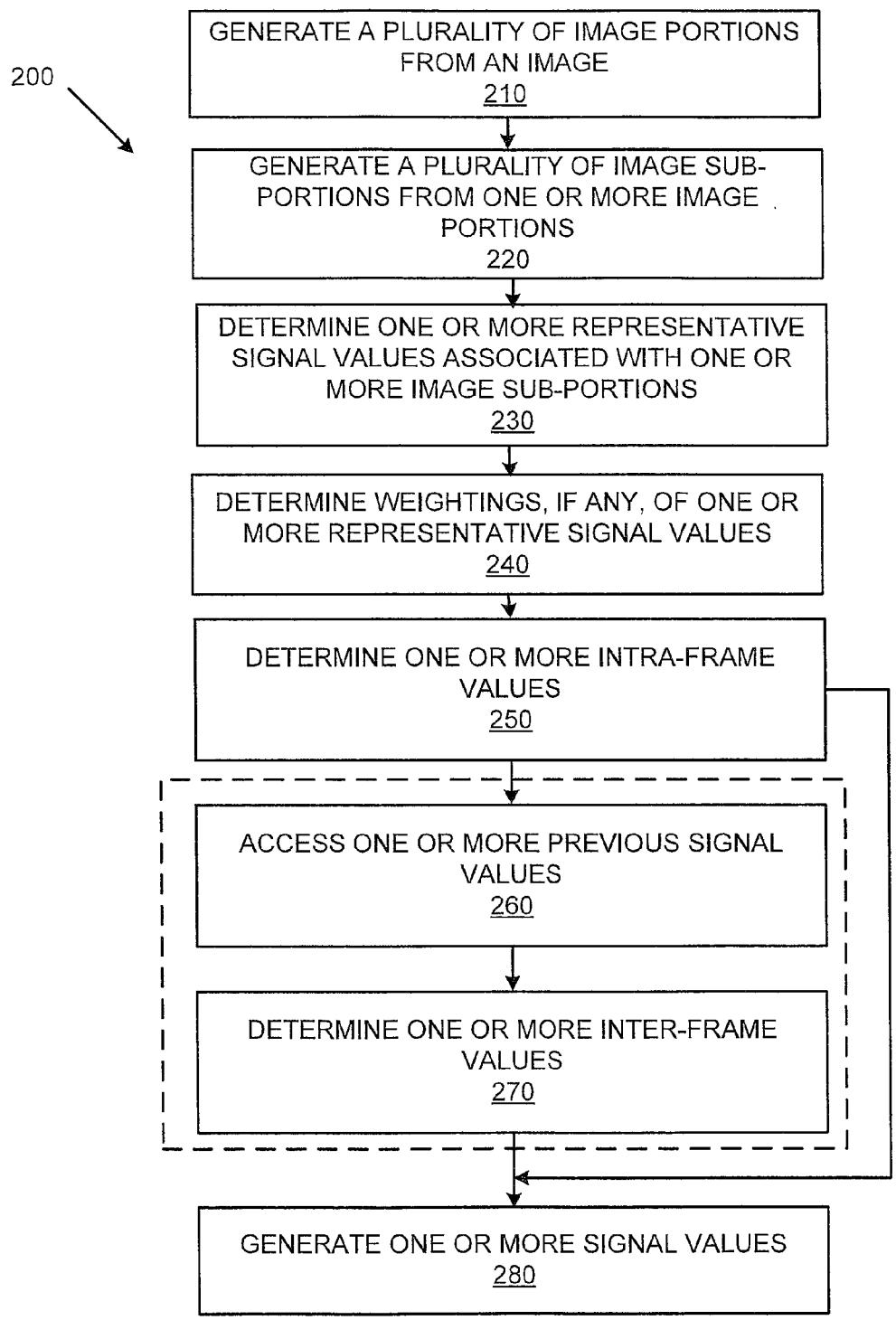
FIG. 2 is a flow diagram depicting an embodiment of an exemplary method for adjusting a brightness level associated with one or more luminescent bodies.

FIG. 2 depicts an embodiment of an exemplary method for adjusting a brightness level associated with one or more luminescent bodies. At block 210, a process, system or apparatus may generate a plurality of image portions from an image frame. For instance, in an embodiment, a control circuit, such as control circuit 140 in FIG. 1, may partition, portion, or otherwise divide an image frame into a plurality of image portions which are associated with one or more luminescent bodies of light emitter 120, as just an example. Here, it is noted that image portions generated at block 210 may be any shape, size, or configuration, without limitation. For instance, in certain embodiments, image portions generated at block 210 may be symmetric, (e.g., square, rectangle, diamond, etc.), may be irregular, or may overlap with one another, as just a few examples.

Figure 3:
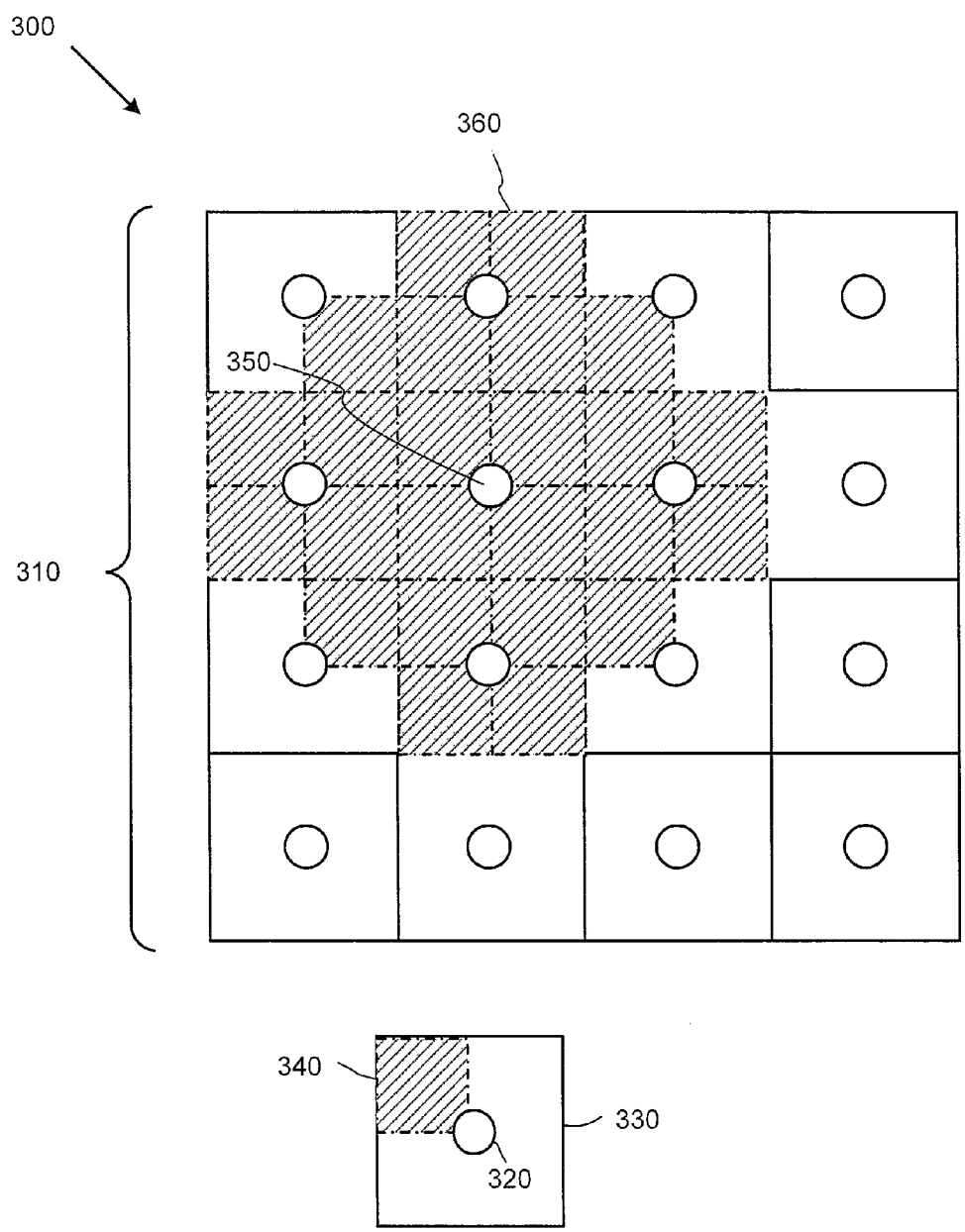
FIG. 3 illustrates a plurality of images portions in accordance with an exemplary embodiment.

To illustrate, FIG. 3 depicts exemplary image portions that may be generated at block 210. First, FIG. 3 depicts a portion of a backlight of a display device with array of luminescent bodies 310 thereon. For convenience, each luminescent body 320 of array 310 is not separately labeled; instead, luminescent body 320, labeled at the bottom of FIG. 3, serves as a key to array 310. Thus, in this illustration, array of luminescent bodies 310 represents a 4×4 array of luminescent bodies 320, which may comprise a portion of a light emitter array, such as a portion of light emitter 120, for example. It should be noted that the configurations or arrangements of array of luminescent bodies 310 depicted in FIG. 3 is merely illustrative of one possible configuration or arrangement; accordingly, there may be many different arrangements or configurations for an array of luminescent bodies which are not depicted herein.

Continuing with the illustration, FIG. 3 depicts a plurality of image portions 330. Again, as with luminescent body 320, a sample image portion 330 is depicted at the bottom of FIG. 3 to serve as a key so that image portions depicted in FIG. 3 may be respectively identified. Accordingly, in this illustration, image portions 330 are depicted in a 4×4 array where each image portion is depicted as being associated with a particular luminescent body 320. Here, it is noted that exemplary image portions 330 depicts only one exemplary size and/or shape of an image portion. Of course, image portions may be generated to form into any shape, size, or configuration, without limitation; accordingly, the scope of claimed subject matter is not to be limited to these particular examples or illustrations.

In certain embodiments, image portions may be generated dynamically, such as by control circuit 140, or may be predetermined. To illustrate, in certain embodiments, a process, system or apparatus at block 210 may determine a particular image portion size, shape, etc., and/or a particular number of image portions to be generated dynamically based, at least in part, on the computational complexity associated with a particular image, device, etc. In certain embodiments, the number of image portions may mirror the number of luminescent bodies associated with a particular portion of a backlight. In other words, in certain embodiments, the number of image portions may match the number of luminescent bodies, as just an example.

Returning to FIG. 2, at block 220, a process, system or apparatus may generate a plurality of image sub-portions from one or more of image portions. For example, FIG. 3 depicts image sub-portion 340 as a sub-portion of image portion 330. As above, image sub-portion 340, depicted at the bottom of FIG. 3, may serve as a reference for image sub-portions depicted in embodiment 300. For instance, in embodiment 300, one or more image sub-portions may be formed at block 220, which may portion, divide or otherwise partition one or more image portions into one or more image sub-portions. In certain embodiments, image sub-portions may be determined to be small enough so that a single representative value may be adequate to represent image proprieties of that image sub-portion.

Returning to FIG. 2, at block 230, a process, system or apparatus may determine one or more representative signal values of one or more image sub-portions. In this context, representative signal values may comprise one or more values which represent image properties associated with image sub-portions, such as intensity, brightness, peak or average luminance value, peak or average value for color channels, or the like, as just a few examples.

In certain embodiments, for example, a process, system or apparatus at block 230 may determine one or more representative signal values by selecting a peak subpixel signal value (e.g., $Peak_i = Max(R_i, G_i, B_i)$) associated with a particular image sub-portion. Here, subpixel values may comprise $R_i$, $G_i$, $B_i$ which represent intensity or brightness values, i, associated with red, green, and blue color channels, respectively, for a particular image sub-portion, as an example. For example, in certain embodiments, a representative value associated with a particular image sub-portion may be determined as follows: Representative Value=Max(subpixel signal value$_{ij}$) for an image sub-portion. Here, the subscript "ij" may designate a particular image sub-portion, such as using a Cartesian coordinate system identifying a particular image sub-portion located at row i, column j, as just an example.

In certain embodiments, a particular image sub-portion may be associated with a plurality of peak subpixel signal values; thus, in these embodiments, determining a representative value may include selecting a plurality of peak subpixel signal values associated with a particular image sub-portion and determining a single subpixel signal value based, at least in part, on a function of the plurality of peak subpixel signal values. In certain embodiments, a function of a plurality of peak subpixel signal values may comprise an average and/or maximum subpixel value associated with an image sub-portion. For instance, assume a particular image sub-portion is associated with peak subpixel signal values P1, P2, P3 and P4. Here, a representative value for this image sub-portion may be determined as a function of peak subpixel signal values P1-P4 (e.g., Representative Value=Mean($Peak_{i \in (P1 \sim P4)}$), as just an example.

At block 240, a process, system or apparatus may determine a weighting of one or more representative values. Accordingly, in certain embodiments, one or more representative values may comprise a weighted representative value. In certain embodiments, a weighting for one or more of representative values may be determined based, at least in part, on a distance from one or more image sub-portions to a particular luminescent body. To illustrate, in one exemplary embodiment, a weighting for a particular representative value may be based, at least in part, on a distance from a particular image sub-portion to a particular luminescent body. Here, a weighting may comprise a value which may comprise a decreasing function of distance (e.g., inversely proportional to a distance) from a particular image sub-portion to a particular luminescent body, such as $weight_{ij} = \alpha / dist_{ij}$. As above, the subscript "ij" may designate a particular image sub-portion, such as using a Cartesian coordinate system identifying a particular image sub-portion located at row i, column j, as just an example. Also, in certain embodiments, a value "$\alpha$" in the above equation may be determined dynamically or set to a predetermined constant.

At block 250, a process, system or apparatus may determine at least one intra-frame value for a particular luminescent body. Here, in this context, the phrase "intra-frame" value means a signal value comprising a plurality of representative signal values associated with a plurality of image sub-portions related to a particular luminescent body. Accordingly, in certain embodiments, a process, system or apparatus at block 250 may determine which image sub-portions are related to a particular luminescent body. To illustrate, FIG. 3 depicts a plurality of related image sub-portions 360 (entire shaded area) which in embodiment 300 are determined to be related to luminescent body 350, as just one example. Here, the determination of which one or more image sub-portions may be related to a particular luminescent body may be performed dynamically, such as by control circuit 140, or may be predetermined, such as at manufacture, for example. In addition, a determination of which image sub-portions may be related to a particular luminescent body may be performed at any time, such as before or after a determination of representative values, weighting, etc. Also, it should be noted that the shape, size and/or configuration of a plurality of related image sub-portions 360 is merely exemplary of one shape, size and/or configuration; accordingly, the scope of claimed subject matter is not to be limited to these particular examples or illustrations.

In certain embodiments, an intra-frame value may be determined as a function of a set of representative values associated with a plurality of related image sub-portions. For example, in certain embodiments, an intra-frame value may be a signal value comprising a maximum value based on a plurality of representative values associated with related image sub-portions. To illustrate, in FIG. 3, suppose, for example, an intra-frame value may be determined for luminescent body 350 based on representative values associated with a plurality of image sub-portions 360 related to luminescent body 350. Here, an intra-frame value for luminescent body 350 may be determined as max(Related Representative Values$_{i \in (M \times N)}$), where, for convenience and ease of reference, related image sub-portions 360 are denoted by an area notation (M×N). Of course, the notation (M×N) is meant to merely denote the set of related image sub-portions 360; thus, it does not imply any particular configuration, arrangement, or the like.

As suggested above, in certain embodiments, representative values may comprise weighted representative values. Thus, in certain embodiments, an intra-frame value may be a determined with one or more weighted representative values. For example, in an embodiment, an intra-frame value may be determined as f(Weight, Related Representative Values) where Weight=$\alpha / dist_{ij}$ as just an example. Here, then, an intra-frame value may be max(Weight×Related Representative Values$_{i\epsilon(M\times N)}$) or max(Related Representative Values$_{i,j}\times$ Weight$_{i,j}$) i,j$\epsilon$(M×N), as yet another example.

Figure 4:
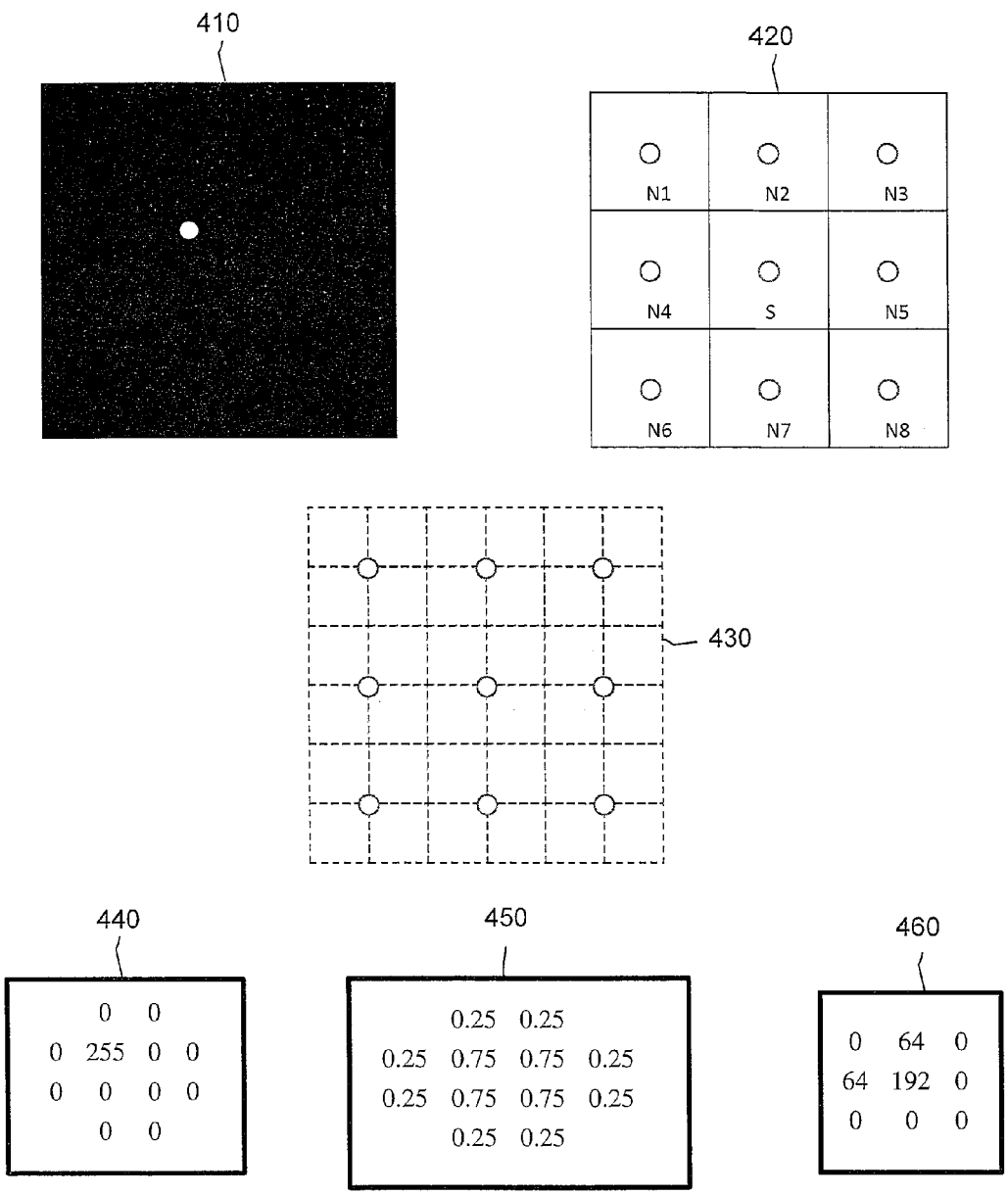
FIG. 4 depicts adjusting a brightness level associated with one or more luminescent bodies, according to an embodiment.

FIG. 4 provides an exemplary illustration for adjusting a brightness level associated with one or more luminescent bodies, according to an embodiment. Image 410 depicts an image of a white dot against a black background, which may be displayed by one or more luminescent bodies in image portions 420. Suppose, in this illustration, that image portions 420 were determined as previously described. Thus, here each luminescent body N1-N8 and S corresponds to a particular image portion.

In this illustration, further assume that a process and/or apparatus determined a plurality of image sub-portions 430, such as previously described, based on image portions 420. In essence, image portions depicted in 420 are further portioned into image sub-portions 430 (depicted separated by dashed lines). In this illustration, 12 of the 36 image sub-portions (blue area) may be determined to be related to a particular luminescent body, such as luminescent body S (at the center of the blue area), as just an example.

Here, image information 440 represents a matrix of representative values corresponding to image 410, a portion of which maps to the blue area of image sub-portions of 430. In other words, maximum subpixel value "255" in image information 440 corresponds to the effect of white dot in image 410 which may be illuminated, at least in part, by luminescent body S in 420. Correspondingly, subpixel values "0" in image information 440 correspond to the representative values according to the dark space surrounding the white dot.

In this illustration, an intra-frame value may be determined for luminescent body S based, at least in part, on a plurality of representative values associated with the blue area of image sub-portions 430. Here, a peak subpixel value for each sub-portion of the blue area of image sub-portion 430 may be the values depicted by 440. Thus, the representative value matrix for the blue portion of image sub-portion 430 corresponding to luminescent body S may be $$\begin{matrix} & 0 & 0 & \\ 0 & 255 & 0 & 0 \\ 0 & 0 & 0 & 0 \\ & 0 & 0, & \end{matrix}$$

as just an example.

In addition, weighting values 450 represents a matrix of values corresponding to the blue area of image sub-portions 430. Here, it may be apparent that, in this particular illustration, weighting values for image sub-portions may be based, at least in part, on a function of the distance of a particular sub-portion to a particular luminescent body, such as luminescent body S. Here, a respectively higher weighing of "0.75" is assigned to sub-portions in closer proximity to luminescent body S. In this illustration, the weighting matrix is $$\begin{matrix} & 0.25 & 0.25 & \\ 0.25 & 0.75 & 0.75 & 0.25 \\ 0.25 & 0.75 & 0.75 & 0.25 \\ & 0.25 & 0.25, & \end{matrix}$$

as just an example.

Accordingly, in this illustration, if the equation max(Representative Value$_{i,j}$·Weight$_{i,j}$) i,j$\epsilon$ (sub-image portion) is used to determine an intra-frame value, the intra-value for luminescent body S will be 192. Here, this intra-frame value may be used to adjust the brightness level associated with one or more luminescent bodies of 420 by applying this intra-frame value to one or more luminescent bodies of 420.

For example, in certain embodiments, one or more intra-frame values may be used to generate one or more signal values depicted at block 280. For example, in certain embodiments, an intra-frame value may comprise a signal value, such as generated by one or more techniques described herein, for use in adjusting a brightness level associated with one or more luminescent bodies. To illustrate by example, returning to FIG. 4, the intra-frame value for luminescent body S was 192. Here, the generated signal value matrix 460 represents this intra-frame value (e.g., 192) applied to one or more luminescent bodies of 420. Accordingly, the generated signal value for N1 to N8 and S are $$\begin{matrix} 0 & 64 & 0 \\ 64 & 192 & 0 \\ 0 & 0 & 0, \end{matrix}$$

as just an example.

Figure 5:
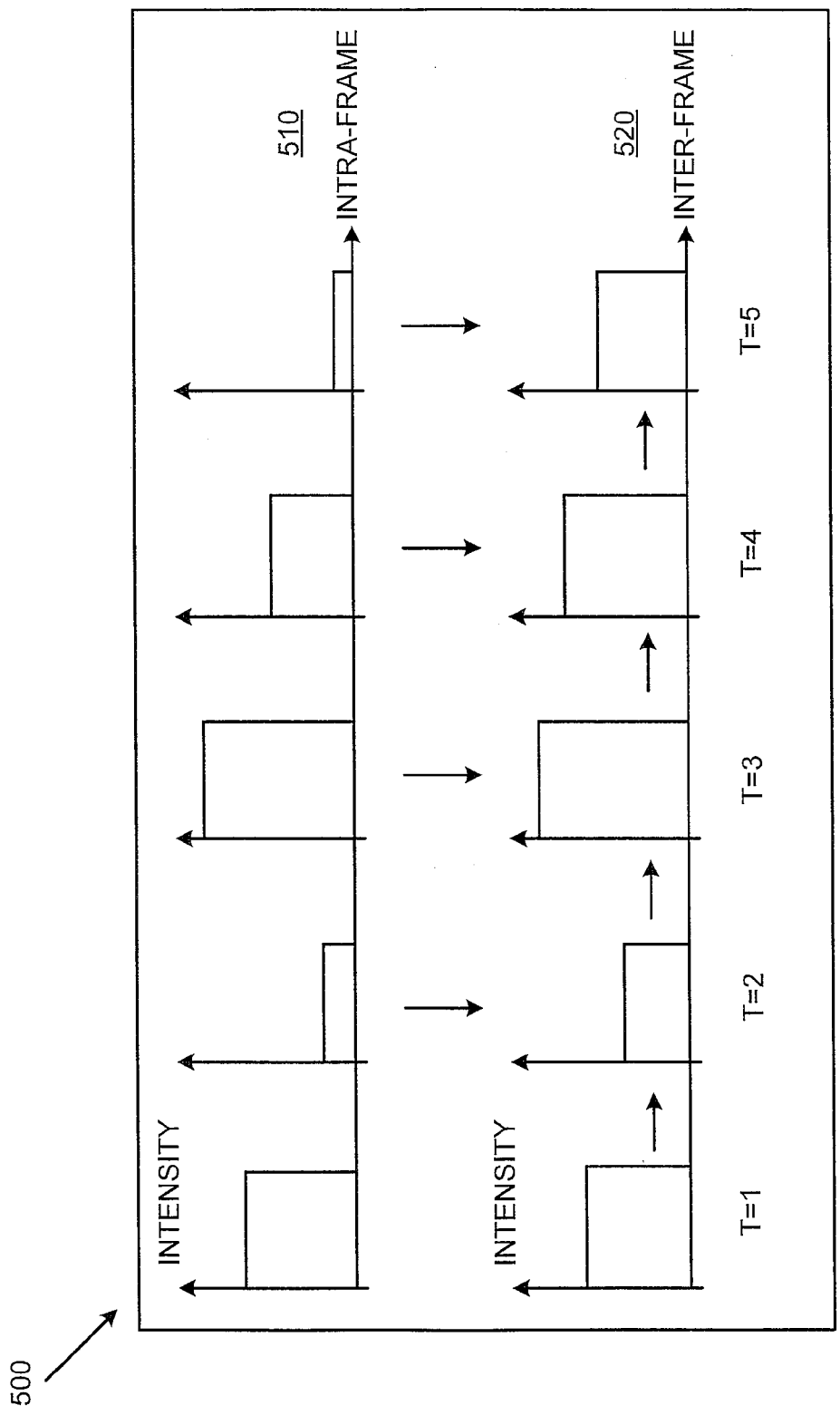
FIG. 5 depicts two graphs with exemplary intensity levels associated with exemplary intra-frame values and/or inter-frame values, according to an embodiment.

FIG. 5 depicts exemplary intensity levels associated with exemplary intra-frame values 510, according to an embodiment. Intra-frame value 510 at T=1, for example, may represent an intensity level associated with a particular luminescent body. Here, intra-frame value 510 at T=1 may reflect a signal value which is higher, lower, or equal in intensity to one or more signal values generated from input image information, such as input image information 150 in FIG. 1, as just an example.

In certain embodiments, it may be desirable to generate one or more signal values which are a function of one or more intra-frame values and/or one or more inter-frame values. In this context, the phrase "inter-frame value" means a signal value which may be a function of one or more intra-frame values, one or more current frame values, and/or one or more previous frame values, such as previous intra-frame values, for example. For clarity, as mentioned previously, a generated signal value may be based at least in part on at least one intra-frame value, at least one inter-frame value, or a function thereof. Thus, in certain embodiments, a brightness level may be adjusted solely from intra-frame values. In other embodiments, however, an inter-frame value, which may include one or more intra-frame values, may be determined and used to adjust a brightness level.

To illustrate, returning to FIG. 2, in certain embodiments, a process, system, or apparatus at block 260 may access one or more previous signal values. In certain embodiments, one or more previous signal values may be one or more previous intra-frame values, as just an example. In other embodiments, one or more previous signal values may be one or more input signal values, such as original signal values from image information 150, for example.

At block 270, a process, system or apparatus may determine one or more inter-frame values for a particular luminescent body based, at least in part, on one or more current or previous signal values, such as signal values associated with a current or previous image frame. To illustrate, FIG. 5 depicts exemplary intensity levels associated with exemplary inter-frame values 520 according to an embodiment. Here, inter-frame values 520 at T=2, for example, may be determined based, at least in part, as a function of a current intra-frame value, say intra-frame value 410 at T=2, and a previous intra-frame value, say intra-frame value 410 at T=1, as just an example.

In certain embodiments, for example, an inter-frame value may be determined based, at least in part, on a weighting sum of a current intra-frame value and a previous intra-frame or inter-frame value (e.g., Inter-frame value=$\alpha \times$Intra-frame value$_T$+$\beta \times$Intra-frame value$_{T-1}$), where $\alpha$ and $\beta$ represent weighting constants, Intra-frame value$_T$ represents a current intra-frame value and Intra-frame value$_{T-1}$ represents a previous intra-frame value. In certain embodiments, $\alpha+\beta$ may equal 1. Of course, this may not be the case in other embodiments. In certain embodiments, yet another way to determine an inter-frame value may be as follows: max($\alpha \times$Intra-frame Intra-frame value$_{T-1}$, Intra-frame value$_T$, $\beta \times$max(Inter-frame value)), as yet another example.

A process, system or apparatus at block 280 may generate one or more signal values. In certain embodiments, a signal value at block 280 may comprise a signal value which may be at least one intra-frame value and/or at least one inter-frame value, and/or a function thereof, such as described above. Thus, in certain embodiments, an inter-frame value may be a signal value which may be used to adjust a brightness level associated with one or more luminescent bodies.

Of course, as mentioned previously, one or more generated signal values, such as depicted at block 280, may be transmitted or outputted to an LCD panel to adjust one or more pixel values. For instance, control circuit 140 in FIG. 1, for example, may output one or more generated signal values to LCD panel 130, which may allow LCD panel 130 to compensate for an adjusted brightness level of a portion of light emitter 120, as just an example.

Certain implementations or embodiments may have a variety of advantages. For example, exemplary advantages associated with at least one embodiment may include potentially improved power savings and thermal management characteristics. In certain embodiments, power saving improve roughly 30% compared to other local diming techniques, for example.

In addition, exemplary advantages related to display characteristics associated with at least one embodiment may include potentially improved contrast or color performance ratios. For instance, certain embodiments may potentially improve color performance which may exceed NTSC standards, as just an example.

Also, another exemplary advantage of at least one embodiment may be that a generated signal for a particular luminescent body may be related to one or more representative values. Here, this generated signal may more desirably capture characteristics of an image. Likewise, it may minimize motion halo effect or maintain more desirable brightness for bright objects, as just some examples. In addition, in at least one embodiment, a generated signal for a particular luminescent body may be related to one or more previous frame signals. One advantage of this approach, for example, may be that it may make backlight changes for moving images more smooth. For example, this approach may act as a low-pass filter in a time domain, which may prevent an image from changing too fast, as just an example.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. Reference throughout this specification to "one embodiment" or "an embodiment" or a "certain embodiment" means that a particular feature, structure, or characteristic described in connection with the embodiment is included in at least one embodiment of claimed subject matter. Thus, the appearances of the phrase "in one embodiment" or "an embodiment" or a "certain embodiment" in various places throughout this specification are not necessarily all referring to the same embodiment. Furthermore, the particular features, structures, or characteristics may be combined in one or more embodiments. Embodiments described herein may include machines, devices, engines, or apparatuses that operate using digital signals. Such signals may comprise electronic signals, optical signals, electromagnetic signals, or any form of energy that provides information between locations.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, features that would be understood by one of ordinary skill were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

What is claimed is:

1. A method, comprising:
generating one or more electrical signal values corresponding to one or more luminescent bodies of at least a portion of a backlight of a display device to adjust a brightness level associated with said at least a portion of said backlight, said generating one or more signal values comprising:
generating a plurality of image sub-portions from an input image;
selecting a group of image sub-portions related to a particular luminescent body of said portion selected from said plurality of image sub-portions;
determining at least one intra-frame value for said particular luminescent body, said at least one intra-frame value being determined based, at least in part, on a plurality of representative signal values associated with said selected group of image sub-portions; and
determining one or more weight values associated with said one or more representative signal values, wherein said one or more weight values are based, at least in part, on a distance from one or more of said image sub-portions to said particular luminescent body, said at least one intra-frame value being determined as a function of said one or more calculated representative signal values and said one or more weight values, wherein at least one intra-frame value is determined to be equal to Max(weight value$_i$*representative signal value$_i$) i$\in$I, wherein I represents the number of said selected image sub-portions,
wherein at least a first selected group of image sub-portions overlaps at least a second selected group of image sub-portions.

2. The method of claim 1, wherein said adjusting a brightness level associated with at least a portion of backlight of a display device comprises adjusting an intensity of a signal value corresponding to said one or more luminescent bodies.

3. The method of claim 1, further comprising:
determining said representative signal values associated with a plurality of image sub-portions related to said particular luminescent body, said determining comprising:
for at least one of said plurality of image sub-portions, selecting one or more peak subpixel signal values associated with said at least one of said plurality of image sub-portion; and
if a plurality of said peak subpixel signal values are selected, further determining a representative signal value associated with said at least one of said plurality of image sub-portion based, at least in part, on a function of said plurality of said peak subpixel signal values.

4. The method of claim 3, wherein said determining representative signal value associated with said image sub-portion based, at least in part, on a function of said plurality of said peak subpixel signal values comprises determining a maximum or average signal value associated with said plurality of said peak subpixel signal values.

5. The method of claim 1, further comprising:
accessing one or more previous signal values corresponding to said particular luminescent body of said portion, or accessing one or more previous representative signal values associated with said plurality of image sub-portions related to said particular luminescent body.

6. The method of claim 5, wherein said one or more previous signal values comprises one or more previous intra-frame values.

7. The method of claim 5, further comprising:
determining at least one inter-frame value associated with at least one luminescent body of said portion based, at least in part, on one or more current or previous signal values.

8. The method of claim 1, wherein said at least one intra-frame value is determined based, at least in part, on said plurality of representative signal values associated with said selected group of image sub-portions and a distance between each image sub-portion within said selected group and said particular luminescent body.

9. The method of claim 1, wherein said determining said at least one intra-frame value comprises:
calculating a weight value of a plurality of image sub-portions of said selected group based, at least in part, on a distance between one of said plurality of image sub-portions and said particular luminescent body;
calculating a representative signal value of said plurality of image sub-portions within said selected group; and
determining said at least one intra-frame value based on said calculated representative signal value and said calculated weight values of said selected group of a plurality of image sub-portions of said selected group.

10. The method of claim 9, wherein said calculated weight value of one of said plurality of image sub-portions of said selected group is determined as a decreasing function of said distance between said one of said plurality of image sub-portion and said particular luminescent body.

11. An apparatus, comprising:
a light emitter comprising an array of luminescent bodies;
an LCD panel coupled to said light emitter; and
a control circuit electrically coupled to said light emitter and said LCD panel, wherein said control circuit is capable of generating one or more signal values corresponding to one or more of said luminescent bodies based, at least in part, on at least one intra-frame value and at least one inter-frame value, wherein said at least one intra-frame value comprises a value which is a function of a plurality of related representative values, said control circuit additionally being capable of selecting a group of image sub-portions, wherein at least a first of said plurality of image sub-portions overlaps at least a second of said plurality of image sub-portions, said control circuit further being capable of determining one or more weight values associated with said one or more representative signal values, wherein said one or more weight values are based, at least in part, on a distance from one or more of said image sub-portions to said particular luminescent body, said at least one intra-frame value being determined as a function of said one or more calculated representative signal values and said one or more weight values, wherein at least one intra-frame value is determined as being equal to Max(weight value*representative signal value$_i$) i∈I, wherein I represents the number of said selected image sub-portions.

12. The apparatus of claim 11, wherein said control circuit is capable of outputting one or more generated signal values to said LCD panel to adjust one or more LCD pixel values, at least in part, in response to said generated signal values.

13. The apparatus of claim 11, wherein said array of luminescent bodies comprises a plurality of light emitting diodes.

14. The apparatus of claim 11, wherein said light emitter, said LCD panel, and said control circuit comprise at least a portion of a display device capable of displaying an image.

15. The apparatus of claim 14, wherein said display device capable of displaying an image comprises at least one of the following: a television, a handheld device, a computer device, or combinations thereof.

16. The apparatus of claim 11, wherein one or more of said plurality of related representative values comprise weighted representative values.

17. The apparatus of claim 16, wherein a weighting associated with one or more of said weighted representative values is based, at least in part, on a predetermined value.

18. An apparatus, comprising:
a light emitter comprising an array of luminescent bodies;
an LCD panel coupled to said light emitter;
and a control circuit electrically coupled to said light emitter and said LCD panel, wherein said control circuit is capable of determining at least one intra-frame value based, at least in part, on one or more representative signal values associated with one or more related image sub-portions, wherein at least one of said representative signal values comprises at least one peak subpixel value corresponding to a particular luminescent body associated with a particular related image sub-portion, wherein at least a first of said plurality of related image sub-portions overlaps at least a second of said plurality of related image sub-portions, said control circuit additionally being capable of, said control circuit further being capable of determining one or more weight values associated with said one or more representative signal values, wherein said one or more weight values are based, at least in part, on a distance from one or more of said image sub-portions to said particular luminescent body, said at least one intra-frame value being determined as a function of said one or more calculated representative signal values and said one or more weight values, wherein at least one intra-frame value is determined as being equal to Max(weight value$_i$*representative signal value$_i$) i∈I, wherein I represents the number of said selected image sub-portions.

19. The apparatus of claim 18, wherein said control circuit is further capable of adjusting a brightness level of one or more luminescent bodies of said light emitter using said at least one intra-frame value, at least in part.

20. The apparatus of claim 18, wherein one or more of said representative signal values comprise one or more weighted representative signal values.

21. The apparatus of claim 18, wherein said control circuit is further capable to partition one or more image portions into a plurality of image sub-portions.

\* \* \* \* \*